(12) United States Patent
Sakuraba

(10) Patent No.: US 8,908,211 B2
(45) Date of Patent: Dec. 9, 2014

(54) PRINTING SYSTEM, PRINTING CONTROL APPARATUS, AND NON-TRANSITORY COMPUTER READABLE RECORDING MEDIUM STORED WITH PRINTING CONTROL PROGRAM

(71) Applicant: Tamotsu Sakuraba, Sagamihara (JP)

(72) Inventor: Tamotsu Sakuraba, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 38 days.

(21) Appl. No.: 13/732,667

(22) Filed: Jan. 2, 2013

(65) Prior Publication Data

US 2013/0188222 A1 Jul. 25, 2013

(30) Foreign Application Priority Data

Jan. 19, 2012 (JP) .................................. 2012-009092

(51) Int. Cl.
*G06F 3/12* (2006.01)
*G06K 15/00* (2006.01)

(52) U.S. Cl.
CPC ............ *G06F 3/1296* (2013.01); *G06F 3/1285* (2013.01); *G06F 3/1204* (2013.01); *G06F 3/1257* (2013.01)
USPC .......... 358/1.15; 358/1.1; 358/1.14; 358/1.16

(58) Field of Classification Search
USPC ........ 358/1.15, 1.16, 1.2, 1.14, 1.1, 403, 501, 358/508, 540, 523, 524, 426.06, 448; 399/9, 76, 82, 77, 83, 46, 361, 410; 715/526, 200, 700, 966, 968
See application file for complete search history.

(56) References Cited

U.S. PATENT DOCUMENTS

| | | | | |
|---|---|---|---|---|
| 2005/0060649 A1* | 3/2005 | Kimura et al. | ................ | 715/526 |
| 2008/0151293 A1* | 6/2008 | Narukawa | ................... | 358/1.15 |
| 2009/0128847 A1* | 5/2009 | Ito | ................. | 358/1.15 |
| 2011/0179961 A1* | 7/2011 | Yanagawa | .................... | 101/483 |

FOREIGN PATENT DOCUMENTS

| | | |
|---|---|---|
| JP | 2004-272390 A | 9/2004 |
| JP | 2005-050059 A | 2/2005 |
| JP | 2008-040638 A | 2/2008 |
| JP | 2008-140244 A | 6/2008 |

OTHER PUBLICATIONS

An English Translation of the Office Action (Notification of Reason for Refusal) issued on Jan. 28, 2014, by the Japan Patent Office in corresponding Japanese Patent Application No. 2012-009092. (2 pages).

* cited by examiner

*Primary Examiner* — Ngon Nguyen
(74) *Attorney, Agent, or Firm* — Buchanan Ingersoll & Rooney PC

(57) ABSTRACT

A printing system includes a terminal apparatus and a printing control apparatus. The terminal apparatus includes a setting unit for setting a printing condition for a document, a generating unit for generating print data containing data of the document, setting data indicating the printing condition, and instruction information instructing to register the printing condition, and a transmitting unit for transmitting the print data. The printing control apparatus includes a storage unit for storing the printing condition and name information specifying the printing condition, a receiving unit for receiving the print data, a recognizing unit for recognizing that the print data contains the instruction information, and a registering unit for causing the printing condition indicated by the setting data to be stored in the storage unit if it is recognized that the print data contains the instruction information.

18 Claims, 9 Drawing Sheets

500

| Reprinting utility job management | | | |
|---|---|---|---|
| Job list | | | |
| User name | Job name | Number of sheets | Number of copies |
| ABC | abc | 10 | 1 |
| DEF | def | 5 | 5 |
| GHI | ghi | 1 | 7 |
| JKL | jkl | 10 | 1 |
| MNO | mno | 20 | 10 |
| PQR | pqr | 100 | 1 |

Close

PRINTING SYSTEM, PRINTING CONTROL APPARATUS, AND NON-TRANSITORY COMPUTER READABLE RECORDING MEDIUM STORED WITH PRINTING CONTROL PROGRAM

CROSS-REFERENCE TO RELATED APPLICATION

This application is based on Japanese Patent Application No. 2012-009092 filed on Jan. 19, 2012, the contents of which are incorporated herein by reference.

BACKGROUND

1. Technical Field

The present invention relates to a printing system, a printing control apparatus, and a non-transitory computer readable recording medium stored with a printing control program.

2. Description of Related Arts

There is known a technique that a print job that has been done by a printer is stored in a printer controller to perform reprinting. In this technique, for example, the printer controller that has received print data from a client PC (personal computer) outputs, to the printer, image data obtained by performing a rasterizing process on the print data while the printer controller stores the image data in a hard disk. Reprinting of an image based on the image data is commanded by a user of the client PC by using a reprinting utility installed in the client PC.

Meanwhile, a function of registering a printing condition as a favorite setting while attaching a name to the printing condition is known as a function provided by a printer driver for generating print data. A user selects one favorite setting from a plurality of the settings registered in advance to easily set the desired printing condition. The function of registering the favorite setting is provided in the reprinting utility, as well. According to the reprinting utility, the favorite setting is registered in the printer controller, and read from the printer controller at the time of reprint setting of the print job.

Meanwhile, the favorite setting used more often is used by both the printer driver and the reprinting utility. In this case, for both the printer driver and the reprinting utility, a user needs to set the same printing condition and to register the same printing condition as the favorite setting, and this takes time and effort. For this reason, it is desired to reduce a burden of a user who registers the same favorite setting in both the printer driver and the reprinting utility.

Japanese Patent Application Laid-Open Publication No. 2005-050059 discloses a technique in which the favorite setting is registered in a server apparatus, and the client PC downloads the favorite setting from the server apparatus to set the printing condition. According to this technique, a user can set the same printing condition without registering the favorite setting, for both the printer driver and the reprinting utility. However, according to this technique, each time the favorite setting is used, it is necessary to download the favorite setting from the server apparatus to the client PC. Accordingly, a waiting time is undesirably required.

SUMMARY

In view of the above-described problems, the present invention has been made. Accordingly, an objective of the present invention is to provide a printing system, a printing control apparatus, a non-transitory computer readable recording medium stored with a printing control program, that can reduce a burden of a user who registers the same favorite setting in both a printer driver and a reprinting utility used in a printing system including a terminal apparatus for generating print data and the printing control apparatus for processing the print data.

To achieve at least one of the above-mentioned objects, a printing system reflecting one aspect of the present invention is a printing system comprising a terminal apparatus that generates print data and a printing control apparatus that processes the print data, wherein the terminal apparatus includes a setting unit for setting a printing condition for a processing target document, a generating unit for generating print data containing data of the processing target document described in a page-description language, setting data indicating the printing condition set by the setting unit, and instruction information instructing to register the printing condition, and a transmitting unit for transmitting the print data generated by the generating unit, and the printing control apparatus includes a control-apparatus-side storage unit for storing the printing condition and name information specifying the printing condition, the printing condition being associated with the name information, a receiving unit for receiving the print data transmitted by the transmitting unit, a recognizing unit for recognizing that the print data received by the receiving unit contains the instruction information, and a registering unit for causing the printing condition indicated by the setting data contained in the print data to be stored in the control-apparatus-side storage unit if the recognizing unit recognizes that the print data contains the instruction information.

Preferably, the terminal apparatus further includes a terminal-apparatus-side storage unit for storing the printing condition and the name information specifying the printing condition, the printing condition being associated with the name information, and a first receiving unit for receiving a user's selection of one name information from the name information stored in the terminal-apparatus-side storage unit, and preferably, when the first receiving unit receives the selection of the one name information, the setting unit sets the printing condition associated with the one name information, as a printing condition for the processing target document.

Preferably, when the setting unit sets the printing condition associated with the one name information as the printing condition for the processing target document, the generating unit generates the print data containing the instruction information.

Preferably, the terminal apparatus further includes a registration receiving unit for receiving a user's selection of whether or not to register the printing condition, and preferably, when the registration receiving unit receives the selection indicating registration of the printing condition, the generating unit generates the print data containing the instruction information.

Preferably, the print data further contains name information for specifying the printing condition indicated by the setting data contained in the print data, and the registering unit causes the printing condition indicated by the setting data to be stored in the control-apparatus-side storage unit, the printing condition being associated with the name information contained in the print data.

Preferably, if the control-apparatus-side storage unit has already stored the same name information as the name information contained in the print data, the registering unit replaces the printing condition associated with the name information already stored, with the printing condition indicated by the setting data contained in the print data.

Preferably, the printing control apparatus further includes an image data storage unit for storing image data obtained by performing a rasterizing process on the data of the processing target document described in the page-description language, and preferably, the terminal apparatus further includes a second receiving unit for receiving a user's selection of one name information from the name information stored in the control-apparatus-side storage unit, and a commanding unit for commanding execution of a printing process in accordance with the printing condition associated with the one name information received by the second receiving unit, for the image data stored in the image data storage unit.

The objects, features, and characteristics of this invention other than those set forth above will become apparent from the description given herein below with reference to preferred embodiments illustrated in the accompanying drawings.

DETAILED DESCRIPTION

The embodiments of this invention will be described below with reference to the accompanying drawings.

Figure 1:
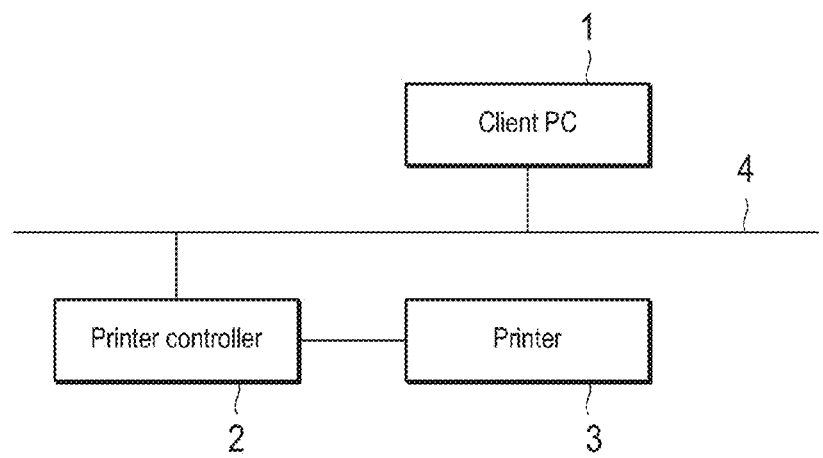
FIG. 1 is a block diagram illustrating an entire configuration of a printing system according to one embodiment of the present invention.

FIG. 1 is a block diagram illustrating an entire configuration of a printing system according to one embodiment of the present invention. The printing system of the present embodiment includes a client PC 1, a printer controller 2, and a printer 3.

The client PC 1 and the printer controller 2 are connected to each other via a network 4 to communicate with each other. The network 4 is constituted by a LAN (Local Area Network) that connects computers and network devices with one another according to a standard such as the Ethernet, the token ring, and the FDDI (Fiber Distributed Data Interface) or constituted by a WAN (Wide Area Network) that connects the LANs with one another by dedicated lines. The printer controller 2 and the printer 3 are connected to each other via a dedicated interface bus such as an IEEE1394 serial bus and a USB (Universal Serial Bus). Alternatively, the printer controller 2 and the printer 3 may be connected to each other via the network 4. Types and the number of devices connected to the network 4 are not limited to an example illustrated in FIG. 1.

Figure 2:
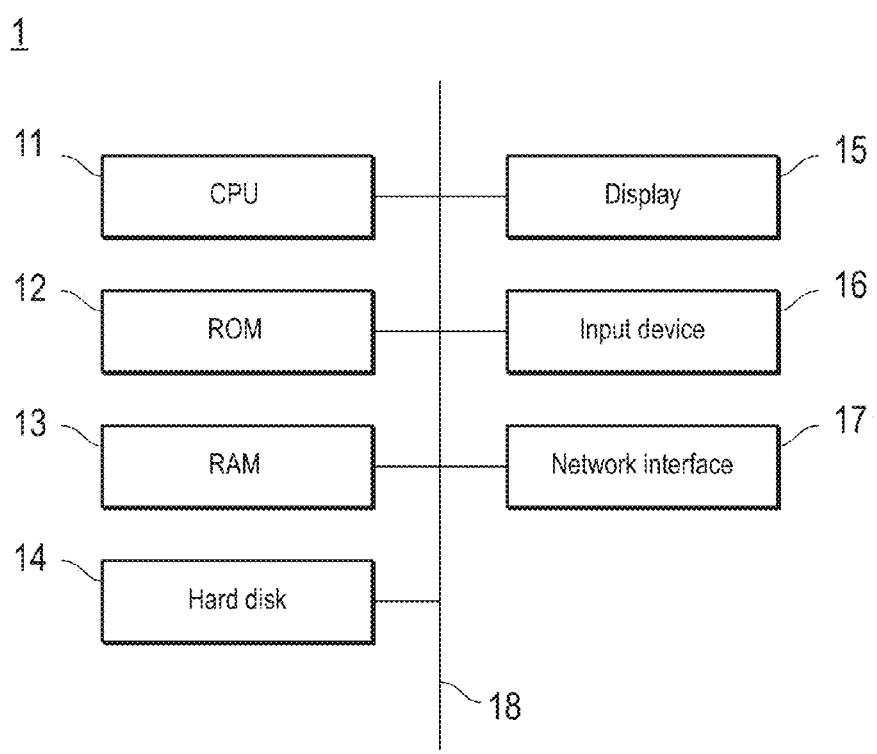
FIG. 2 is a block diagram illustrating a configuration of a client PC in FIG. 1.

FIG. 2 is a block diagram illustrating a configuration of the client PC. The client PC 1 functions as a terminal apparatus, and includes a CPU (Central Processing Unit) 11, a ROM (Read Only Memory) 12, a RAM (Random Access Memory) 13, a hard disk 14, a display 15, an input device 16, and a network interface 17. These elements are connected to one another via a bus 18 for exchanging signals.

The CPU 11 controls the above-described each element and performs various calculating process steps according to programs. The ROM 12 stores the various programs and various data. The RAM 13 functions as a working area, and temporarily stores the programs and the data.

The hard disk 14 stores various data, and various programs including an operating system (OS). A document file creating application (word processing software, table calculating software and the like) for creating a document file, a printer driver for converting the document file into PDL (Page Description Language) data described by a PDL that can be interpreted by the printer controller 2, and a reprinting utility for commanding reprinting of the print job stored in the printer controller 2 are installed in the hard disk 14. The hard disk 14 functions as a terminal-apparatus-side storage unit, and stores a printing condition and name information for specifying the printing condition, as the favorite setting for the printer driver, in a state where the printing condition and the name information associated with each other.

The display 15 may be a liquid crystal display, and displays various kinds of information. The input device 16 includes a pointing device such as a mouse, and a keyboard, and is used for performing various inputs. The input device 16 functions as a receiving unit, and receives selection of one favorite setting from a list of the favorite settings, the list being displayed on the display 15.

The network interface 17 is an interface for communicating with other devices via the network 4, and a standard such as the Ethernet, the token ring, and the FDDI is used. The network interface 17 functions as a transmitting unit, and transmits print data to the printer controller 2.

The CPU 11 of the present embodiment executes the program of the printer driver to function as a setting unit and a generating unit. Moreover, the CPU 11 executes the program of the reprinting utility to function as a commanding unit. The setting unit sets a printing condition of a document file (processing target document). The generating unit generates the print data that includes PDL data of the document file, setting data indicating the printing condition of the document file, and an identifier (instructing information) instructing to register the printing condition. The commanding unit commands reprinting of the print job stored in the printer controller 2. The concrete processing contents of each unit will be described below.

Figure 3:
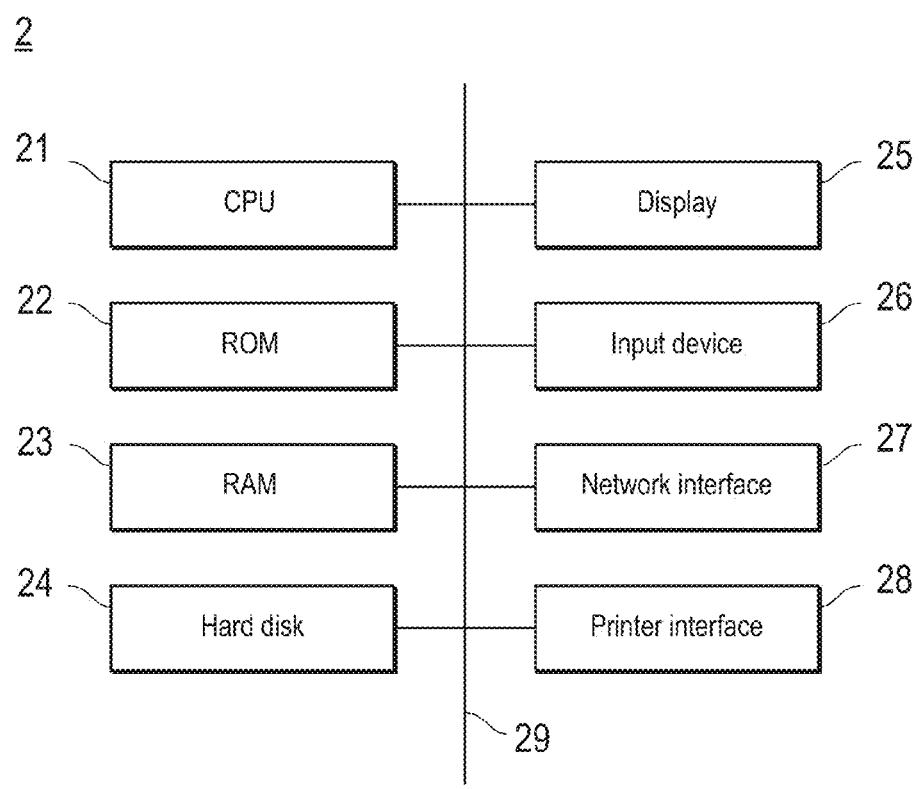
FIG. 3 is a block diagram illustrating a configuration of a printer controller in FIG. 1.

FIG. 3 is a block diagram illustrating a configuration of the printer controller. The printer controller 2 functions as a printing control apparatus, and includes a CPU 21, a ROM 22, a RAM 23, a hard disk 24, a display 25, an input device 26, a network interface 27, and a printer interface 28. These elements are connected to one another via a bus 29 for exchanging signals. Regarding the elements that are included in the above-described respective elements of the printer controller 2 and that have the same functions as those of the client PC 1, description is omitted for avoiding redundant description.

The hard disk 24 stores the program for performing a rasterizing process on the PDL data received from the client PC 1 to generate image data in a bitmap format, and stores the program for managing the print jobs. The hard disk 24 functions as an image data storage unit, and stores the image data in the bitmap format per job. The hard disk 24 functions as a control-apparatus-side storage unit, and stores the printing condition and the name information for specifying the printing condition, as the favorite setting for the reprinting utility, in a state where the printing condition and the name information are associated with each other.

The network interface 27 functions as a receiving unit, and receives the print data transmitted from the client PC 1. The printer interface 28 is provided for communicating with the locally connected printer 3.

The CPU 21 of the present embodiment executes the program for managing print jobs to function as a recognizing unit and a registering unit. The recognizing unit recognizes that the identifier is contained in the print data, the identifier instructing to register the favorite setting. The registering unit causes the printing condition to be stored as the favorite setting in the hard disk 24, the printing condition indicated by the setting data contained in the print data. The concrete processing contents of each unit will be described below.

Figure 4:
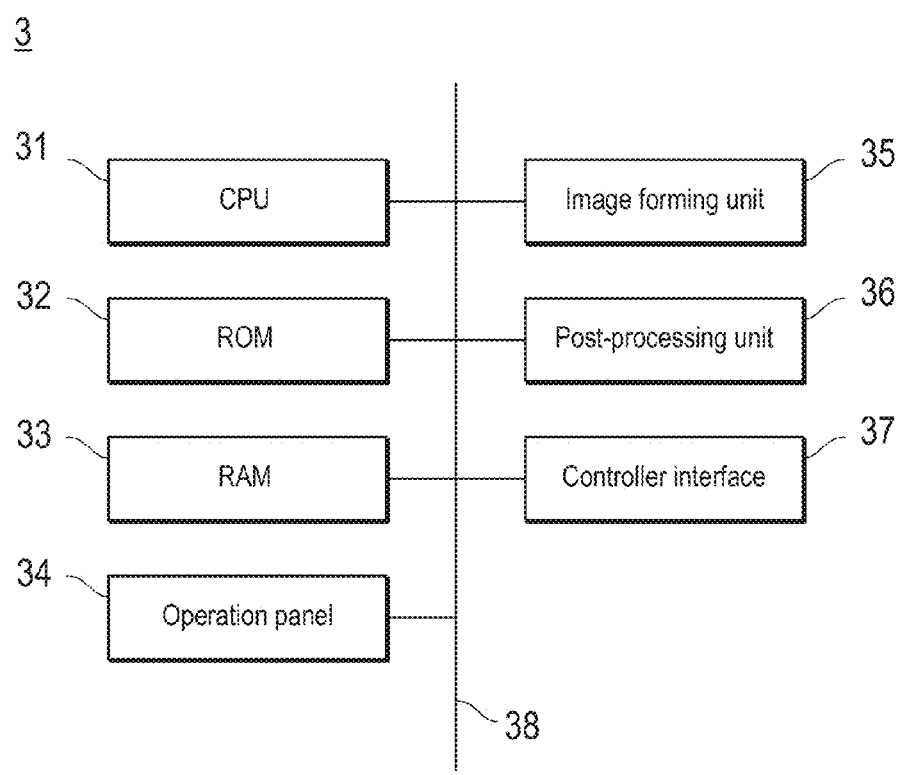
FIG. 4 is a block diagram illustrating a configuration of a printer in FIG. 1.

FIG. 4 is a block diagram illustrating a configuration of a printer. The printer 3 functions as a printing apparatus, and includes a CPU 31, a ROM 32, a RAM 33, an operation panel 34, an image forming unit 35, post-processing unit 36, and a controller interface 37. These elements are connected to one another via a bus 38 for exchanging signals. Regarding the elements that are included in the above-described respective elements of the printer 3 and that have the same functions as those of the client PC 1, description is omitted for avoiding redundant description.

The operation panel 34 includes a touch panel, a numeric key, a start button, a stop button, and the like, and is used in displaying various kinds of information, and inputting various commands.

The image forming unit 35 uses a well-known image creating process such as an electro-photographic process to form an image on a recording medium such as paper, the image being based on image data received from the printer controller 2.

The post-processing unit 36 performs a post-process such as a stapling process, a punch hole forming process, and a folding process on the paper on which the image is formed by the image forming unit 35.

The controller interface 37 is provided for communicating with the locally connected printer controller 2.

Figure 5:
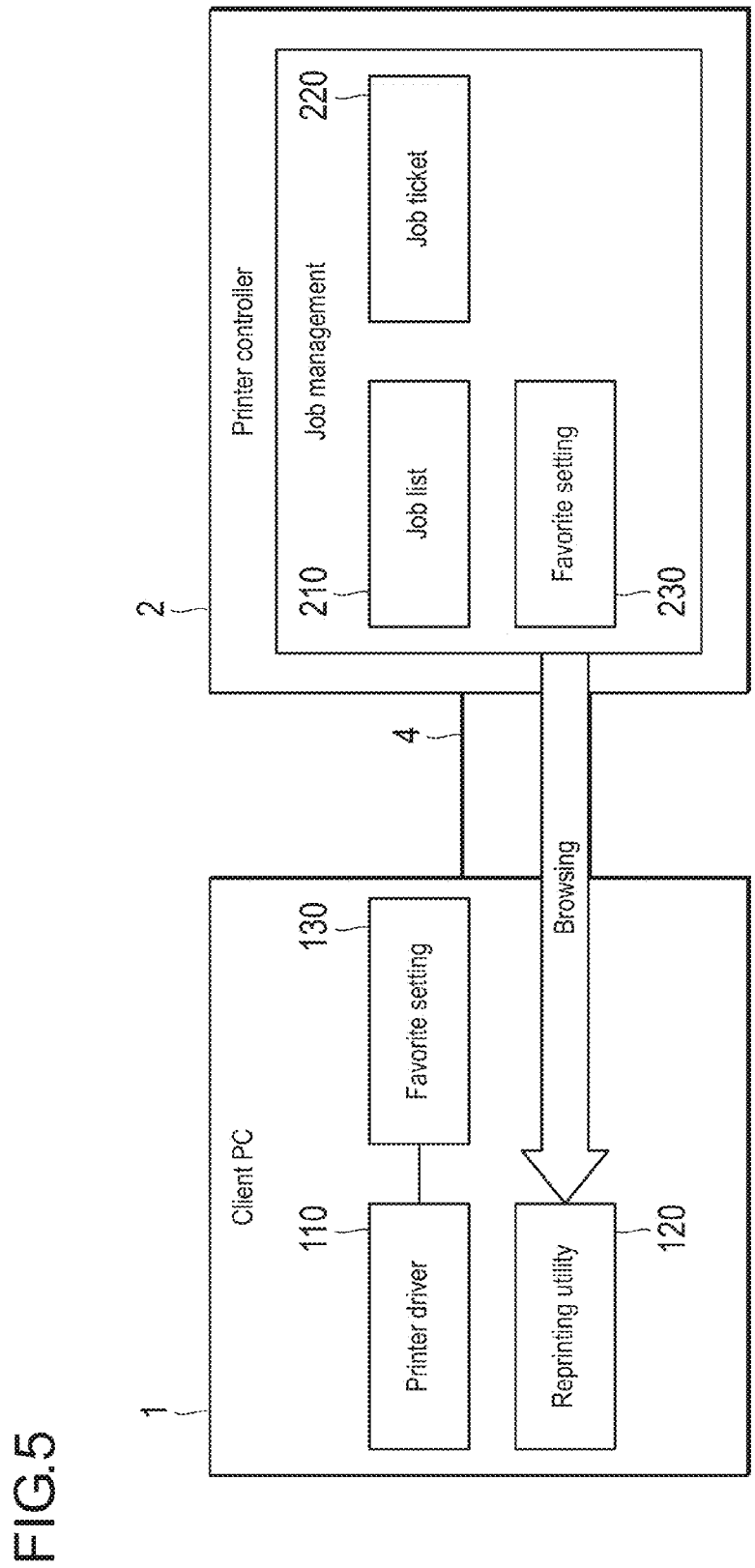
FIG. 5 is a block diagram illustrating favorite setting storage functions of the client PC and the printer controller.

FIG. 5 is a block diagram illustrating favorite setting storage functions of the client PC and the printer controller.

As described above, the printer driver 110 for generating the print data and the reprinting utility 120 for commanding reprint of the print job are installed in the client PC 1. The client PC 1 is provided with a storage area 130 storing the favorite setting read when the printing condition is set on a print setting screen provided by the printer driver 110. The favorite setting is stored in the storage area 130 in a predetermined file format. Alternatively, differently from the present embodiment, the favorite setting may be stored in a registry area.

A job list 210 is stored in the printer controller 2, the job list 210 indicating a list of the print jobs stored in the printer controller 2. For example, when a command to store the print job is input via the print setting screen provided by the printer driver 110, the image data is stored in the printer controller 2 per job, the image data being obtained by performing a rasterizing process on the PDL data generated by the printer driver 110. The printer controller 2 is provided with a storage area 220 storing, as a job ticket, the printing condition indicated by the setting data contained in the print data. Further, the printer controller 2 is provided with a storage area 230 storing the favorite setting read when the printing condition is set on a print setting screen provided by the reprinting utility 120. The favorite setting stored in the storage area 230 is read by the client PC 1 via the network 4 at the time of the reprint setting of the print job.

Each of the client PC 1, the printer controller 2, and the printer 3 may include a configuration element other than the above-described elements, or does not need to include a part of the above-described elements.

According to the printing system of the present embodiment configured as described above, when a user of the client PC 1 selects the favorite setting and commands printing on the print setting screen provided by the printer driver 110, the printing condition same as that of the selected favorite setting is registered, as the favorite setting for the reprinting utility, in the printer controller 2. In the following, referring to FIGS. 6 to 12, operation of the printing system of the present embodiment will be described.

Figure 6:
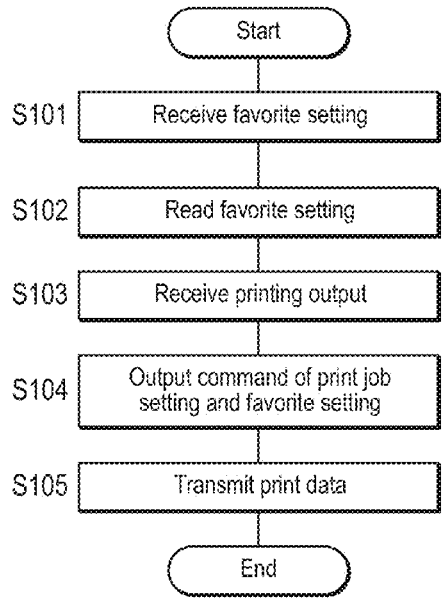
FIG. 6 is a flowchart showing a procedure of a print commanding process performed by the client PC.

FIG. 6 is a flowchart showing a procedure of a print commanding process performed by the client PC. Prior to execution of the print commanding process, the printer driver 110 is activated via a printing dialogue of a document file creating application that has created the printing target document file. Activating the printer driver 110 causes the print setting screen 300 (refer to FIG. 7) to be displayed on the display 15. Algorism shown in the flowchart in FIG. 6 is stored as a program in the hard disk 14 of the client PC 1, and the program is executed by the CPU 11.

First, the favorite setting is received (step S101). In the present embodiment, one favorite setting selected by the user from a plurality of the favorite settings registered in advance in the client PC 1 is received, the one favorite setting being selected via the print setting screen 300 (refer to FIG. 7).

Figure 7:
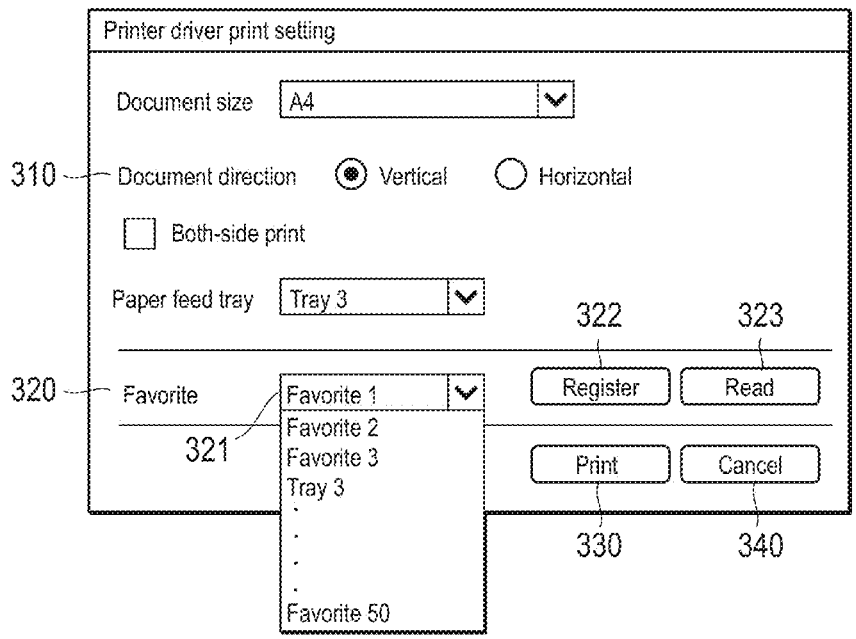
FIG. 7 illustrates one example of a print setting screen provided by a printer driver.

FIG. 7 illustrates one example of the print setting screen provided by the printer driver. The print setting screen 300 includes a printing condition setting part 310 and a favorite setting part 320. The print setting screen 300 includes a printing button 330 for commanding execution of printing and a cancel button 340 for canceling the execution of printing.

The printing condition setting part 310 includes a plurality of print setting items for specifying the printing condition. A user of the client PC 1 can change set values of the various print setting items such as a stapling process, a punch hole forming process, a page allocation process, and a both-side printing process to set the printing condition.

The favorite setting part 320 includes a pull-down menu 321 for selecting the favorite setting, a registering button 322 for registering the favorite setting, and a reading button 323 for reading the favorite setting. The user of the client PC 1 selects one favorite setting from the list of the favorite settings (names) displayed in the pull-down menu 321, and pushes the reading button 323 so that the printing condition can be set. The user of the client PC 1 pushes the registering button 322 so that the current setting of the printing condition setting part 310 can be registered as the favorite setting.

In the process of step S101, the one favorite setting selected by the user from the list of the favorite settings registered in advance in the client PC 1 is received, the one favorite setting being selected via the favorite setting part 320 of the print setting screen 300.

Next, the favorite setting is read (step S102). In the present embodiment, the printing condition associated with the one favorite setting received in the process of step S101 is read. As a result, the printing condition affects the printing condition setting part 310, and the set values of the print setting items are updated.

Next, the printing output is received (step S103). In the present embodiment, the printing button 330 on the print setting screen 300 is pushed so that the printing output is received.

Next, the commands of the print job setting and the favorite setting are output (step S104). In the present embodiment, the setting data and the identifier are output, the setting data indicating the printing condition that has been read in the process of step S102, the identifier instructing to register the printing condition in the printer controller 2.

Next, the print data is transmitted (step S105), and the process is then terminated. In the present embodiment, the print data that includes the setting data and the identifier output in the process of step S104, and that includes the PDL data of the document file is generated, and the generated print data is transmitted to the printer controller 2.

As described above, according to the process of the flowchart shown in FIG. 6, the favorite setting is selected, and the printing condition is set at the time of print setting of the document file. The print data including the identifier is then generated, the identifier instructing that the same printing condition as the printing condition that has been set for the document file be registered in the printer controller 2. The generated print data is transmitted to the printer controller 2.

Figure 8:
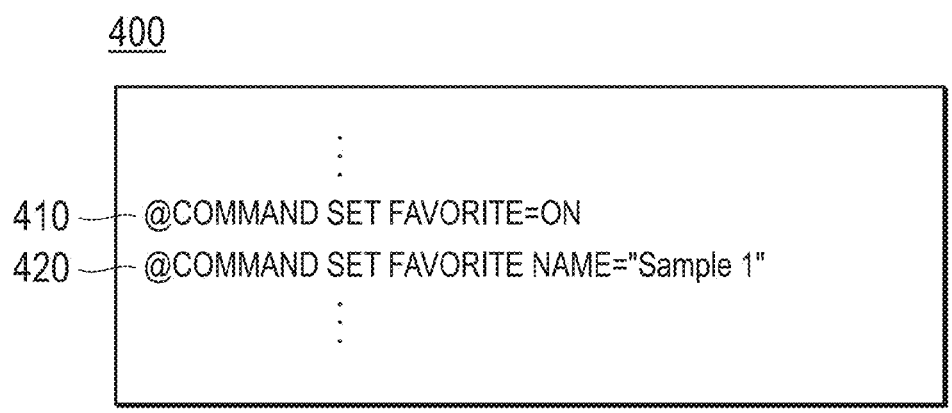
FIG. 8 illustrates one example of an identifier contained in print data.

FIG. 8 illustrates one example of the identifier contained in the print data. The print data 400 contains the identifier 410 instructing to register the printing condition, and the name information 420 for specifying the printing condition. In the present embodiment, when the favorite setting is selected on the print setting screen 300 to set the printing condition, the identifier 410 and the name information 420 are added to the print data. The name information 420 indicates the name of the favorite setting selected on the print setting screen 300.

When the printer controller 2 recognizes that the identifier 410 is contained in the print data 400, the printing condition indicated by the setting data contained in the print data 400 is registered as the favorite setting for the reprinting utility, in the hard disk 24 of the printer controller 2. In the following, referring to FIG. 9, operation of the printer controller 2 will be described.

Figure 9:
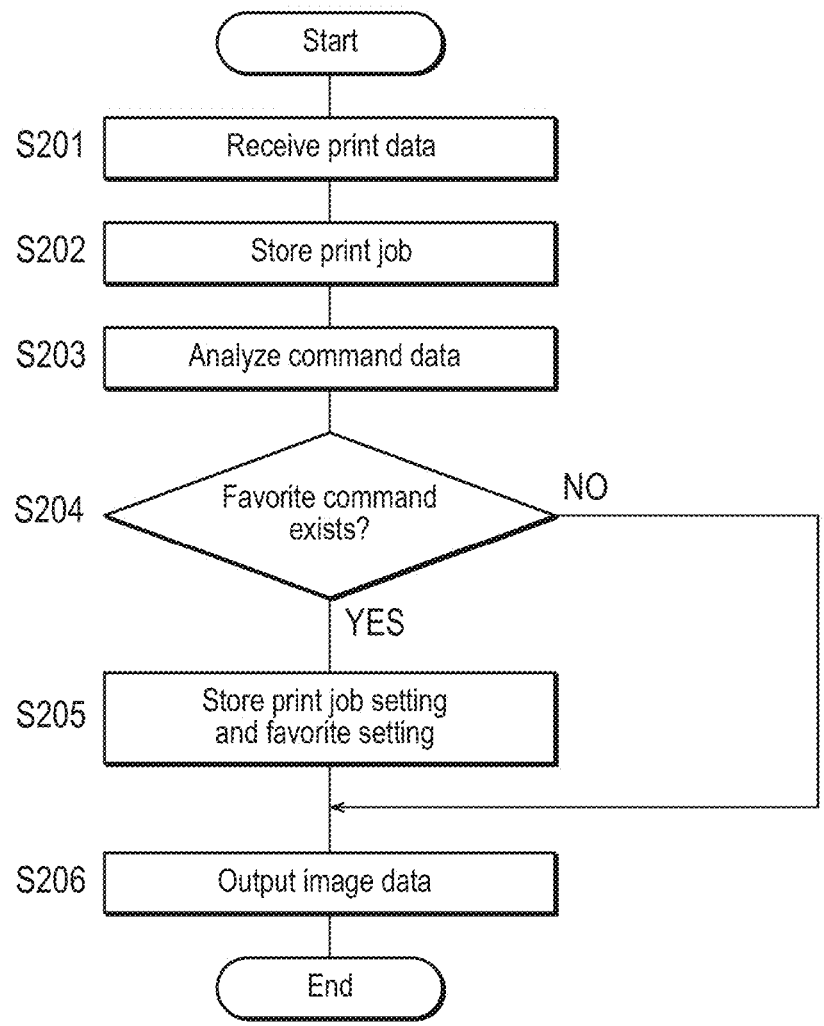
FIG. 9 is a flowchart showing a procedure of a printing control process performed by the printer controller.

FIG. 9 is a flowchart showing a procedure of a printing control process performed by the printer controller. The algorithm shown in the flowchart in FIG. 9 is stored as the program in the hard disk 24 of the printer controller 2, and the program is executed by the CPU 21.

First, the print data is received (step S201). In the present embodiment, the print data transmitted from the client PC 1 in the process of step S105 of FIG. 6 is received.

Next, the print job is stored (step S202). In the present embodiment, the rasterizing process of the PDL data contained in the print data received in the process of step S201 is first performed to generate the image data in the bitmap format. The generated image data is then stored in the hard disk 24. Storing the image data in the hard disk 24 enables the print job to be viewed by means of the reprinting utility 120.

Next, the command data is analyzed (step S203). In the present embodiment, the setting data contained in the print data received in the process of step S201 is analyzed, and the job ticket commanding the operation of the printer 3 is generated. The job ticket is stored in the hard disk 24 in a state where the job ticket is associated with the image data.

Next, it is determined whether or not a favorite command exists (step S204). In the present embodiment, it is determined whether or not the print data received in the process of step S201 contains the identifier 410 (refer to FIG. 8) instructing to register the printing condition.

When it is determined that the favorite command does not exist (step S204: NO), the procedure proceeds to step S206.

Meanwhile, it is determined that the favorite command exists (step S204: YES), the print job setting and the favorite setting are stored (step S205). In the present embodiment, the printing condition indicated by the setting data contained in the print data received in the process of step S201 is stored as the favorite setting for the reprinting utility 120 in the hard disk 24 in a state where the printing condition is associated with the name information 420 contained in the print data. If the printing condition having the same name has been already stored in the hard disk 24, the already stored printing condition is replaced with the new printing condition. If the printing condition indicated by the setting data contained in the print data includes a function that the reprinting utility 120 does not have, this function is ignored. If the reprinting utility 120 has a function other than the printing condition indicated by the setting data, a default setting is used for this function.

Next, the image data is output (step S206), and the process is terminated. In the present embodiment, the image data generated in the process of step S202 is output to the printer 3. At this time, the job ticket generated in the process of step S203 is transmitted to the printer 3, as well. In accordance with the described contents of the job ticket, the printer 3 forms an image based on the image data on paper, and then performs the post-process on the paper on which the image has been formed.

As described above, according to the process of the flowchart shown in FIG. 9, when it is recognized that the print data contains the identifier instructing to register the printing condition, the printing process based on the print data is performed while the printing condition indicated by the setting data is registered as the favorite setting for the reprinting utility. To the favorite setting for the reprinting utility, the name indicated by the name information contained in the print data is added.

As described above, according to the printing system of the present embodiment, the favorite setting is selected on the print setting screen 300 provided by the printer driver 110, and the print data is transmitted. Thereby, the same favorite setting as the favorite setting selected on the print setting screen 300 is registered as the favorite setting for the reprinting utility in the printer controller 2. According to such a configuration, time and effort that a user takes to register the favorite setting for the reprinting utility 120 for commanding reprint of the print job is eliminated. In other words, a burden of a user who registers the same favorite setting for the printer driver 110 and the reprinting utility 120 is reduced.

In the following, referring to FIGS. 10 to 12, the process of using the reprinting utility to perform reprint of the print job stored in the printer controller 2 will be described.

Figures 10, 11:
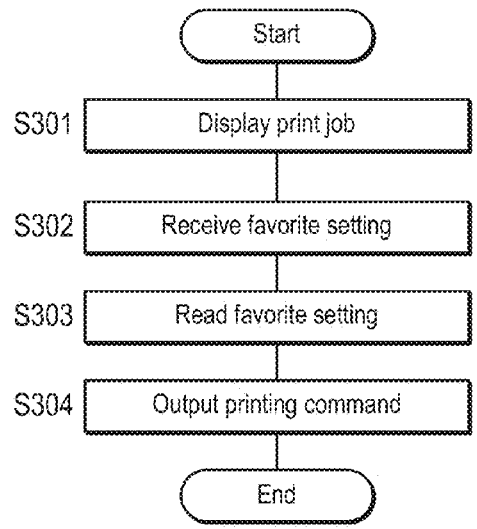
FIG. 10 is a flowchart showing a procedure of a reprint commanding process performed by the client PC.
FIG. 11 illustrates one example of a job managing screen provided by a reprinting utility.

FIG. 10 is a flowchart showing a procedure of the reprint commanding process performed by the client PC. Algorism shown in the flowchart in FIG. 10 is stored as a program in the hard disk 14 of the client PC 1, and the program is executed by the CPU 11.

First, the print job is displayed (step S301). In the present embodiment, the reprinting utility 120 is activated, and a job managing screen 500 (refer to FIG. 11) is displayed on the display 15.

FIG. 11 illustrates one example of the job managing screen. The job managing screen 500 displays information of the job list 210 stored in the printer controller 2. The job managing screen 500 displays a list of information (user names, job names and the like) regarding the print jobs stored in the printer controller 2.

Next, the favorite setting is received (step S302). In the present embodiment, first, one print job is selected from the list of the print jobs displayed in the process of step S301 to display a print setting screen 600 (refer to FIG. 12). The one favorite setting selected by the user from a plurality of the favorite settings registered in advance in the printer controller 2 via the print setting screen 600 is then received.

Figure 12:
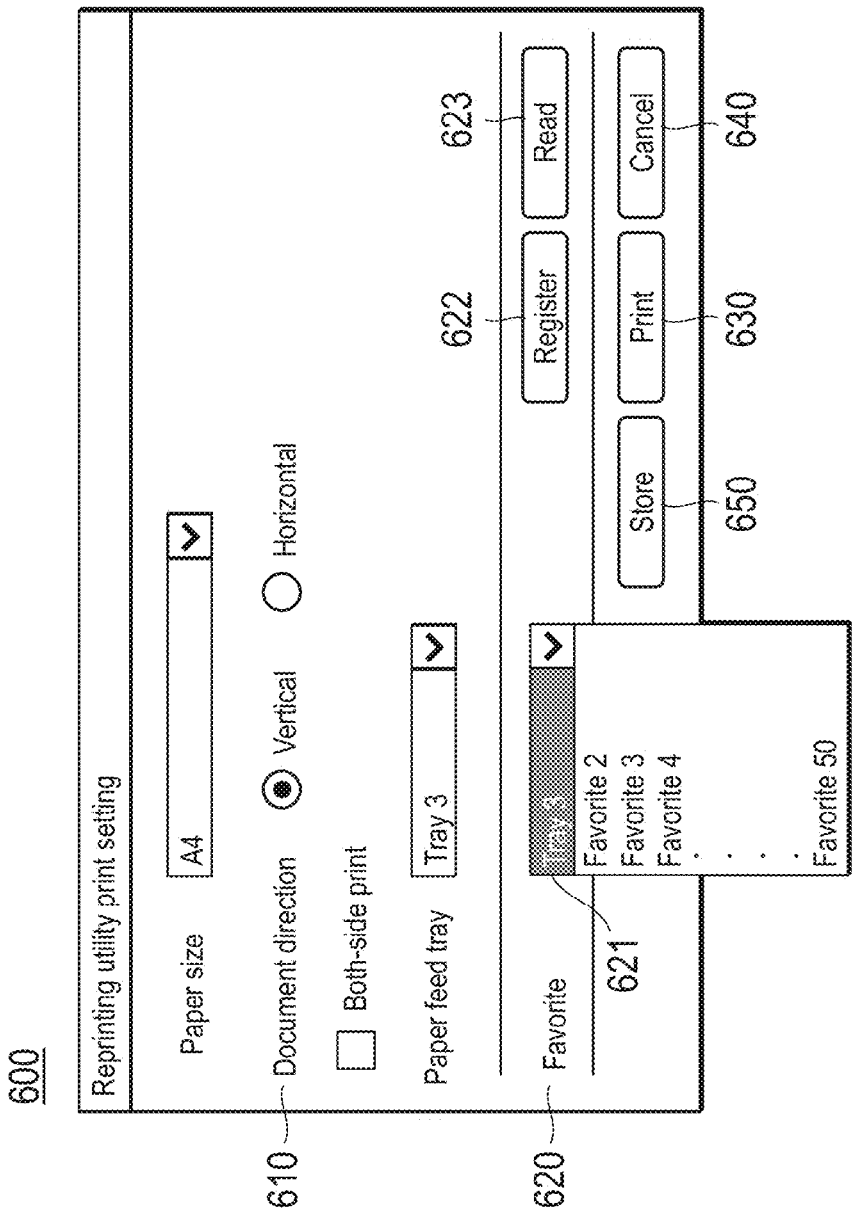
FIG. 12 illustrates one example of a print setting screen provided by the reprinting utility.

FIG. 12 illustrates one example of the print setting screen provided by the reprinting utility. The print setting screen 600 includes a printing condition setting part 610 and a favorite setting part 620. The print setting screen 600 includes a printing button 630 for commanding execution of printing, a cancel button 640 for canceling the execution of printing, and a storage button 650 for causing the print setting to be stored as the job ticket.

The printing condition setting part 610 includes a plurality of print setting items for specifying the printing condition. The user of the client PC 1 can set the printing condition by changing set values of the print setting items.

The favorite setting part 620 includes a pull-down menu 621 for selecting the favorite setting, a registering button 622 for registering the favorite setting, and a reading button 623 for reading the favorite setting. The user of the client PC 1 selects one favorite setting from the list of the favorite settings displayed in the pull-down menu 621, and pushes the reading button 623 so that the printing condition can be set. The user of the client PC 1 pushes the registering button 622 so that the current setting of the printing condition setting part 610 can be registered as the favorite setting.

In the process of step S302, the one favorite setting selected by the user from the list of the favorite settings registered in advance in the printer controller 2 is received, the one favorite setting being selected via the favorite setting part 620 in the print setting screen 600.

Next, the favorite setting is read (step S303). In the present embodiment, the printing condition associated with the one favorite setting received in the process of step S302 is read. As a result, the printing condition affects the printing condition setting part 610, and the set values of the print setting items are updated.

Next, the printing command is output (step S304), and the process is terminated. In the present embodiment, the reprint of the print job based on the printing condition read in the process of step S303 is commanded.

As described above, according to the process of the flowchart shown in FIG. 10, the reprint of the print job stored in the printer controller 2 is commanded. At this time, the favorite setting registered in the printer controller 2 is read out to set the printing condition.

The present invention is not limited to the above-described embodiments. Various modifications can be made within the scope of the claims.

For example, in the above-described embodiments, when the favorite setting is selected on the print setting screen provided by the printer driver to set the printing condition, the identifier is automatically added to the print data. However, a checkbox may be provided on the print setting screen for receiving user's selection of whether or not to register the favorite setting so that when the selection to register the favorite setting is received, the identifier can be added to the print data. In this case, regardless of whether or not the favorite setting is selected on the print setting screen provided by the printer driver, the printing condition set on the print setting screen is registered as the favorite setting for the reprinting utility. If the favorite setting has not been selected on the print setting screen provided by the printer driver, name information indicating a temporary name such as "registration 1" is added to the print data.

Further, in the above-described embodiment, the printer controller 2 generates the image data from the PDL data contained in the print data, and the generated image data is output to the printer 3 while the generated image data is stored in the hard disk 24. However, the image data may be stored in the hard disk 24 without outputting of the image data to the printer 3. In addition, the PDL data contained in the print data may be dummy data used only in registering the favorite setting. In this case, the print job is not stored in the printer controller 2, and is deleted.

Furthermore, in the above-described embodiments, the printer controller 2 is provided as a separate entity from the printer 3. However, the printer controller may be incorporated in an image forming apparatus such as a printer and a multifunction peripheral.

The units and method for performing various processes in the printing system according to the present embodiments can be embodied by a dedicated hardware circuit or a programmed computer. The above-described program may be provided by a non-transitory computer readable recording medium such as a flexible disk and a CD-ROM, or provided online via a network such as the Internet. In this case, the program stored in the non-transitory computer readable recording medium is usually transferred to a storage unit such as the hard disk to be stored. Moreover, the above-described program may be provided as single application software, or may be incorporated as one function of the printing system in software of the apparatus thereof.

What is claimed is:

1. A printing system comprising a terminal apparatus that generates print data and a printing control apparatus that processes said print data, said terminal apparatus comprising:
a setting unit for setting a printing condition for a processing target document;
a generating unit for generating print data containing data of said processing target document described in a page-description language, setting data indicating the printing condition set by said setting unit, and instruction information instructing to register said printing condition; and
a transmitting unit for transmitting the print data generated by said generating unit, said printing control apparatus comprising:
a control-apparatus-side storage unit for storing the printing condition and name information specifying said printing condition, said printing condition being associated with said name information;
a receiving unit for receiving the print data transmitted by said transmitting unit;
a recognizing unit for recognizing that the print data received by said receiving unit contains said instruction information; and
a registering unit for causing the printing condition indicated by said setting data contained in said print data to be stored in said control-apparatus-side storage unit when said recognizing unit recognizes that said print data contains said instruction information and for causing the printing condition indicated by said setting data contained in said print data not to be stored in said control-apparatus-side storage unit when said recognizing unit recognizes that said print data does not contain said instruction information.

2. The printing system as claimed in claim 1, said terminal apparatus further comprising:
a terminal-apparatus-side storage unit for storing the printing condition and the name information specifying said printing condition, said printing condition being associated with said name information; and
a first receiving unit for receiving a user's selection of one name information from the name information stored in said terminal-apparatus-side storage unit,
wherein when said first receiving unit receives the selection of said one name information, said setting unit sets the printing condition associated with said one name information, as a printing condition for said processing target document.

3. The printing system as claimed in claim 2, wherein when said setting unit sets the printing condition associated with said one name information as the printing condition for said processing target document, said generating unit generates the print data containing said instruction information.

4. The printing system as claimed in claim 2, said terminal apparatus further comprising:
a registration receiving unit for receiving a user's selection of whether or not to register the printing condition,
wherein when said registration receiving unit receives the selection indicating registration of the printing condition, said generating unit generates the print data containing said instruction information.

5. The printing system as claimed in claim 1, wherein said print data further contains name information for specifying the printing condition indicated by said setting data contained in said print data, and
said registering unit causes the printing condition indicated by said setting data to be stored in said control-apparatus-side storage unit, said printing condition being associated with said name information contained in said print data.

6. The printing system as claimed in claim 5, wherein if said control-apparatus-side storage unit has already stored the same name information as the name information contained in said print data, said registering unit replaces the printing condition associated with said name information already stored, with the printing condition indicated by said setting data contained in said print data.

7. The printing system as claimed in claim 1, said printing control apparatus further comprising:
an image data storage unit for storing image data obtained by performing a rasterizing process on the data of said processing target document described in said page-description language,
said terminal apparatus further comprising:
a second receiving unit for receiving a user's selection of one name information from the name information stored in said control-apparatus-side storage unit; and
a commanding unit for commanding execution of a printing process in accordance with the printing condition associated with said one name information received by said second receiving unit, for the image data stored in said image data storage unit.

8. The printing system as claimed in claim 1, wherein the control-apparatus-side storage unit stores the printing condition separately from said print data.

9. A printing control apparatus used in a printing system comprising a terminal apparatus that generates print data and said printing control apparatus that processes said print data, comprising:
a control-apparatus-side storage unit for storing a printing condition and name information specifying said printing condition, said printing condition being associated with said name information;
a receiving unit for receiving print data containing data of a processing target document described in a page-description language, setting data indicating the printing condition for said processing target document, and instruction information instructing to register said printing condition;
a recognizing unit for recognizing that the print data received by said receiving unit contains said instruction information; and
a registering unit for causing the printing condition indicated by said setting data contained in said print data to be stored in said control-apparatus-side storage unit when said recognizing unit recognizes that said print data contains said instruction information and for causing the printing condition indicated by said setting data contained in said print data not to be stored in said control-apparatus-side storage unit when said recognizing unit recognizes that said print data does not contain said instruction information.

10. The printing control apparatus as claimed in claim 9, wherein said print data further contains name information for specifying the printing condition indicated by said setting data contained in said print data, and
said registering unit causes the printing condition indicated by said setting data to be stored in said control-apparatus-side storage unit, said printing condition being associated with said name information contained in said print data.

11. The printing control apparatus as claimed in claim 10, wherein if said control-apparatus-side storage unit has already stored the same name information as the name information contained in said print data, said registering unit replaces the printing condition associated with said name information already stored, with the printing condition indicated by said setting data contained in said print data.

12. The printing control apparatus as claimed in claim 9, further comprising an image data storage unit for storing image data obtained by performing a rasterizing process on the data of said processing target document described in said page-description language.

13. The printing control apparatus as claimed in claim 9, wherein the control-apparatus-side storage unit stores the printing condition separately from said print data.

14. A non-transitory computer readable recording medium stored with a printing control program for controlling a printing control apparatus that is used in a printing system comprising a terminal apparatus that generates print data and said printing control apparatus that processes said print data, said program causing said printing control apparatus to execute a process comprising:
(a) receiving print data containing data of a processing target document described in a page-description language, setting data indicating a printing condition for said processing target document, and instruction information instructing to register said printing condition;
(b) recognizing that the print data received in said step (a) contains said instruction information; and
(c) when it is recognized in said step (b) that said print data contains said instruction information, causing the printing condition indicated by said setting data contained in said print data to be stored in a control-apparatus-side storage unit, said printing condition being associated with name information specifying said printing condition, when it is recognized in said step (b) that said print data does not contain said instruction information, causing the printing condition indicated by said setting data contained in said print data not to be stored in said control-apparatus-side storage unit.

15. The non-transitory computer readable recording medium as claimed in claim 14, wherein said print data further contains name information for specifying the printing condition indicated by said setting data contained in said print data, and said step (c) includes causing the printing condition indicated by said setting data to be stored in said control-apparatus-side storage unit, said printing condition being associated with said name information contained in said print data.

16. The non-transitory computer readable recording medium as claimed in claim 15, said step (c) including:

if said control-apparatus-side storage unit has already stored the same name information as the name information contained in said print data, replacing the printing condition associated with said name information already stored, with the printing condition indicated by said setting data contained in said print data.

17. The non-transitory computer readable recording medium as claimed in claim 14, said process further comprising:

(d) causing image data to be stored in an image data storage unit, said image data being obtained by performing a rasterizing process on the data of said processing target document described in said page-description language.

18. The non-transitory computer readable recording medium as claimed in claim 14, said step (c) including:

When it is recognized in said step (b) that said print data contains said instruction information, causing the printing condition indicated by said setting data contained in said print data to be stored in said control-apparatus-side storage unit separately from said print data.

* * * * *